(12) United States Patent
Castel

(10) Patent No.: US 10,542,050 B2
(45) Date of Patent: Jan. 21, 2020

(54) AUTOMATED NETWORK SECURITY POLICY CONFIGURATION

(71) Applicant: General Electric Company, Schenectady, NY (US)

(72) Inventor: Brandon Castel, Vancouver (CA)

(73) Assignee: General Electric Company, Schenectady, NY (US)

( * ) Notice: Subject to any disclaimer, the term of this patent is extended or adjusted under 35 U.S.C. 154(b) by 139 days.

(21) Appl. No.: 15/691,612

(22) Filed: Aug. 30, 2017

(65) Prior Publication Data

US 2019/0068650 A1    Feb. 28, 2019

(51) Int. Cl.
*H04L 29/06* (2006.01)
*H04L 12/40* (2006.01)

(52) U.S. Cl.
CPC ............ *H04L 63/205* (2013.01); *H04L 12/40* (2013.01); *H04L 63/1416* (2013.01); *H04L 63/1425* (2013.01)

(58) Field of Classification Search
CPC ............... H04L 63/205; H04L 63/1416; H04L 63/1425; H04L 12/40
See application file for complete search history.

(56) References Cited

U.S. PATENT DOCUMENTS

| | | | | |
|---|---|---|---|---|
| 8,973,141 | B2* | 3/2015 | Rowland | H04L 63/20 726/23 |
| 10,169,585 | B1* | 1/2019 | Pilipenko | G06F 21/566 |
| 2012/0036442 | A1* | 2/2012 | Dare | G06F 8/60 715/736 |
| 2015/0074807 | A1* | 3/2015 | Turbin | H04L 63/1416 726/23 |
| 2016/0191547 | A1* | 6/2016 | Zafar | H04L 63/1416 726/23 |
| 2016/0219078 | A1* | 7/2016 | Porras | G06F 3/0484 |
| 2018/0176252 | A1* | 6/2018 | Nimmagadda | H04L 63/20 |
| 2018/0241719 | A1* | 8/2018 | Koniki | H04L 63/0245 |

* cited by examiner

*Primary Examiner* — Mohammad A Siddiqi
(74) *Attorney, Agent, or Firm* — Fitch Even Tabin & Flannery LLP

(57) ABSTRACT

A security configuration management system accesses, from two or more data sources, network data gathered from a network. The network data includes Internet Protocol (IP) addresses, device types and software used in the network. The system aggregates the network data, yielding an aggregated asset database, and generates, based on the aggregated asset database, a network topology describing computing nodes in the network and interconnections between the computing nodes. The system determines, based on a database of known security vulnerabilities corresponding to device and software profiles, a set of security vulnerabilities for the network and determines a set of security policies for the network based on the set of security vulnerabilities. The system generates network security configurations for the network based on the network topology and the set of security policies, and implements the network security configurations on a network security device in the network.

27 Claims, 10 Drawing Sheets

ACCESS NETWORK DATA FROM DATA SOURCES
502

GENERATE AN AGGREGATED ASSET DATABASE
504

DETERMINE A SET OF SECURITY POLICIES
506

DETERMINE WHITELIST POLICIES
508

GENERATE NETWORK SECURITY CONFIGURATIONS FOR THE NETWORK SECURITY DEVICE
510

IMPLEMENT NETWORK SECURITY CONFIGURATIONS ON THE NETWORK SECURITY DEVICE
512

AUTOMATED NETWORK SECURITY POLICY CONFIGURATION

TECHNICAL FIELD

The present disclosure generally relates to the technical field of special-purpose machines that facilitate network security, including computerized variants of such special-purpose machines and improvements to such variants, and to the technologies by which such special-purpose machines become improved compared to other special-purpose machines that facilitate network security. In particular, the present disclosure addresses systems and methods for automating network security configurations in a network security device.

BACKGROUND

Most people are familiar with the term Information Technology (IT), which covers the spectrum of technologies for information processing, including software, hardware, communications technologies and related services. Operational Technology (OT) is a relatively newer term that refers to hardware and software that detects or causes a change through the direct monitoring and/or control of physical devices, processes and events in the enterprise. For example, OT networks interconnect industrial control systems such as programmable logic controllers, supervisory control and data acquisition systems, distributed control systems, process control domains, safety instrumented systems, and building management and automation systems.

As many organizations are discovering, the Industrial Internet is a huge new opportunity for growth and efficiency. To realize this value, OT environments need to be connected. With production systems becoming more interconnected, the exposure to cyber incidents increases. Attacks and disruptions on critical infrastructure put reputation, production, people, and profits at risk.

Traditionally, OT networks have operated separately from IT networks. For example, OT networks utilize proprietary protocols optimized for the required functions, some of which have become adopted as 'standard' industrial communications protocols (e.g., DNP3, Modbus, Profinet). More recently, IT-standard network protocols are being implemented in OT devices and systems to reduce complexity and increase compatibility with more traditional IT hardware (e.g., TCP/IP). This increase in connectivity, complexity and exposure has led to a demonstrable reduction in security for OT systems.

Industrial network security devices are designed to protect critical infrastructure, control systems and OT assets. Network security devices provide protection from cyber threats and vulnerabilities in OT environments by monitoring and blocking malicious activity and misconfiguration to promote OT safety and protect productivity. While effective, configuring network security devices is a difficult and time intensive manual task. For example, a network administrator is often tasked with manually generating a network topology and selecting appropriate policies and whitelist protocols. Accordingly, improvements are needed.

BRIEF DESCRIPTION OF THE DRAWINGS

The drawings illustrate example embodiments of the present disclosure and do not limit the scope of the present disclosure.

DETAILED DESCRIPTION

Figure 1:
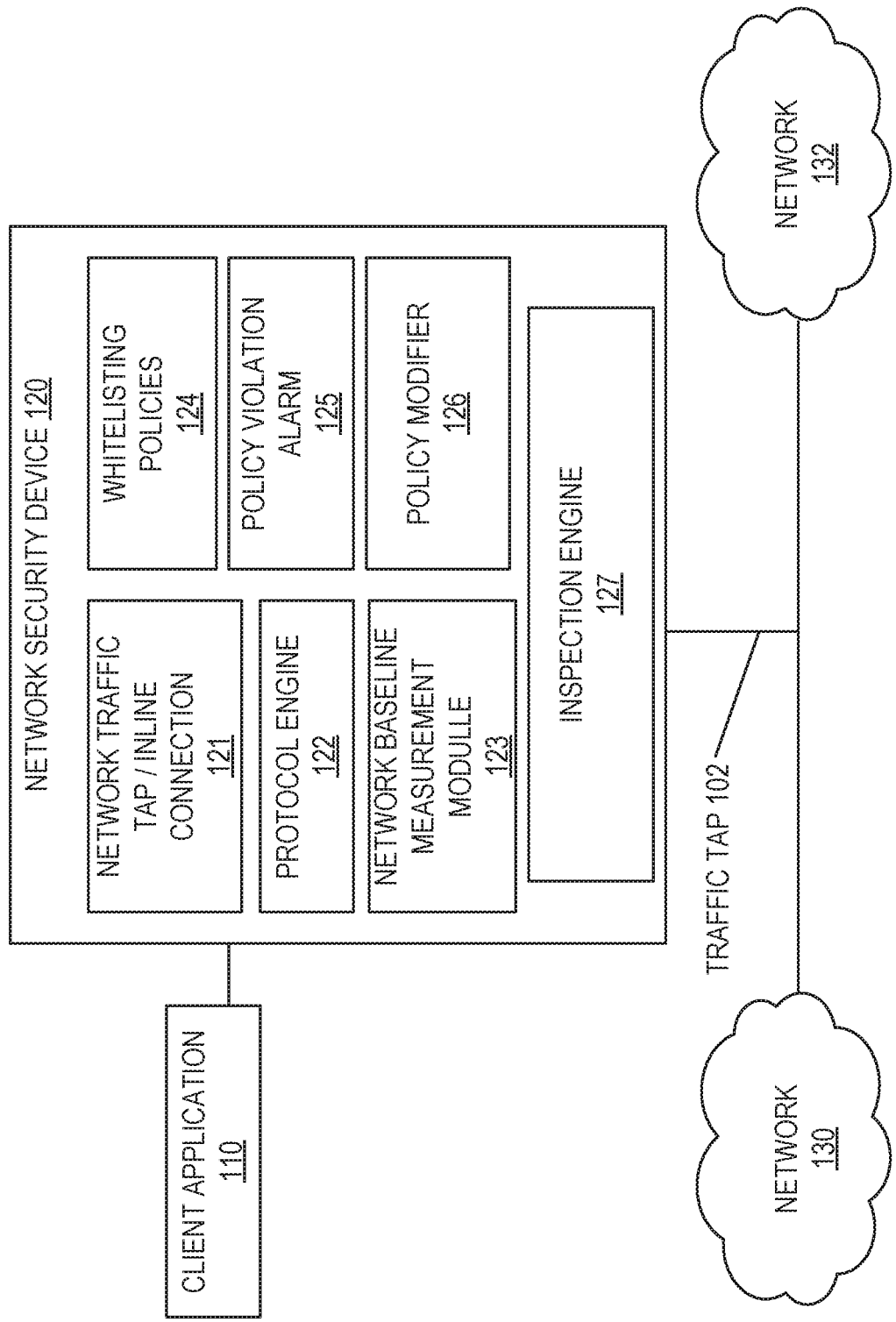
FIG. 1 is a block diagram of a network security device, according to some example embodiments.

Network security devices, such as network firewalls, establish a barrier between a trusted secure network and an outside network (e.g., the Internet) that is assumed to be unsecure or untrusted. The network security device monitors and controls incoming and outgoing network traffic between the secured network and the outside network based on a set of predetermined security policies (e.g., rules). For example, a network security device includes a packet inspection engine that analyzes incoming and outgoing data packets based on the set of predetermined security policies. The network security device can then allow, alert, or drop packets in accordance with its policy, which respectively will forward approved data packets towards their intended destination, log the occurrence of a packet or event, or block data packets that are not approved.

To configure a network security device, a network topology is used to select and apply appropriate security configurations (e.g., policies, whitelists, etc.). A network topology describes the arrangement of a network, such as the computing nodes in the network and the interconnection between the computing nodes. The network topology further includes data describing the network and the computing nodes, such as IP addresses, device types, operating systems, software versions, etc. Traditionally, an administrator is tasked with manually collecting data to generate the network topology, as well as analyzing the network topology to select security policies, whitelist policies, etc. To automate this process, a security configuration management system uses existing data sources to automatically generate a network topology. For example, products or services that are being used on a network may include data that describe the network topology, such as IP addresses, device types, operating systems, etc. The security configuration management system accesses this preexisting data and aggregates the data to generate a network topology. For example, the security configuration management system groups computing nodes from a networking standpoint based on IP addresses to identify hosts and subnetworks within the network.

The security configuration management system further uses the aggregated data to identify known security vulnerabilities (e.g., software bugs with security implications). For example, the security configuration management system has access to a vulnerability database that identifies device and software profiles and corresponding known security vulnerabilities. The security configuration management system matches the device and software profiles in the network to the known device and software profiles to identify corresponding security vulnerabilities. The security configuration management system then uses these vulnerabilities to select appropriate policies to address the vulnerabilities.

The security configuration management system further uses the aggregated data to determine a whitelisting policy. Based on the software running on each computing node and the interconnections between the computing nodes, the security configuration management system determines which computing nodes are likely to communicate with each other as well as the types of messages and protocols that are likely to be transmitted amongst the computing nodes. This data is used to generate a whitelisting policy.

The following figures describe example embodiments, example environments of example embodiments, and example aspects thereof.

FIG. 1 is a block diagram of a network security device 120, according to some example embodiments. As shown, the network security device 120 is connected via a traffic tap 102 to a network 130 and a network 132. Network 130 and network 132 may include both an IT network and an OT network. The network security device 120 establishes a barrier between a trusted secure network (i.e., network 130) and an outside network (e.g., the Internet) that is assumed to be unsecure or untrusted (i.e., network 132). To accomplish this, the network security device 120 monitors and controls incoming and outgoing network traffic between the secured network 130 and the outside network 132 based on a set of predetermined security rules, policies, etc.

As shown, the network security device 120 includes a network traffic tap/inline connection 121, a protocol engine 122, a network baseline measurement module 123, whitelisting policies 124, a policy violation alarm 125, a policy modifier 126, and an inspection engine 127. A client application 110 controls and monitors the network security device 120. For example, the client application 110 implements network security configurations that define performance of the network security device. The network security configurations include a network topology, security policies and whitelisting policies.

The network traffic tap/inline connection 121 has physical and software components to read traffic from and send traffic to both the network 130 and the network 132. The protocol engine 122 processes read traffic from the network 130 and network 132 to extract commands and responses of an OT protocol such as Modbus, DNP3, IEC 60870, BACnet, LonWorks, EPICS, any other SCADA protocol, and any other OT protocol. The protocol engine 122 also processes commands and responses of an OT protocol and generates traffic to send to its intended destination.

The network baseline measurement module 123 monitors network traffic at the network security device 120, including data packets received from both the network 130 and the network 132. The network baseline measurement module 123 uses the monitored network traffic to determine a baseline of normal network traffic that assists in determining whether future network traffic is normal or a security risk.

The whitelisting policies 124 includes a list or register that identifies data traffic that should be allowed to pass to its intended recipient. For example, the whitelisting policies 124 identify data packets that should be allowed based on a source and/or destination computing node, IP address, etc. In some embodiments, the whitelisting policies 124 are formed based on the network baseline measurement module 123 with the assistance of the protocol engine 122 to form policies based on an understanding of commands and responses of an OT protocol. The policy violation alarm 125 executes a remedial action in response to a violation of a policy. Example remedial actions include transmitting a notification to a user for user intervention, as well as a suggestion of a new whitelisting policy to allow more network traffic. In an in-line configuration, another example of a remedial action is to block network traffic.

The policy modifier 126 responds to the policy violation alarm 125 by modifying the whitelisting policies 124 with the assistance of the protocol engine 122 to form policies based on an understanding of commands and responses of an OT protocol. In one example, the policy is stateful and allows certain sequences of one or more commands and/or one or more responses. In another example, the policy is stateless.

The inspection engine 127 analyzes data traffic received by the network security device 120 based on a set of predetermined security policies (e.g. rules). In one example embodiment, the inspection engine 127 implements deep packet inspection where each data packet is dissected into component protocols and filtered based on security policies that may be from the user, from a default, and/or automatically generated by a security configuration management system (not shown). In one example embodiment, a protocol targets a specific controller or group of controllers. For example, in the healthcare industry, the DICOM protocol is used to transport information between medical imaging devices such as MRI machines and workstations or file servers. In one example of a security policy, the inspection engine 127 blocks or alerts on certain operations such as reading a patient file or CAT scan from a specific workstation to a file server.

Example security policies can be based on a variety of factors, such as an inbound traffic rate, a traffic protocol, a traffic pattern, a latency requirement, etc. The inspection engine 127 may apply a single security policy or multiple security policies to a data packet. Additionally, the security policy or policies may change over time or according to another condition.

An example of a security policy based on the inbound traffic rate allows sufficient traffic to bypass based on the capacity of the inspection engine 127. An example of a security policy based on the traffic protocol allows IT traffic to bypass, and causes OT traffic to be analyzed by the inspection engine 127 based on additional security policies. As another example, a security policy based on a traffic protocol allows OT traffic to bypass, and causes IT traffic to be analyzed by the inspection engine 127 based on additional security policies.

An example of a security policy based on a traffic pattern is allowing or blocking data packets based on the source endpoint and/or a destination endpoint of the data traffic. For example, a security policy may allow traffic originating from workstation A (or multiple workstations A) and no other endpoints, only the traffic reaching workstation B (or multiple workstations B) and no other endpoints, or both.

Other example security policies are based on a URI, content (a word or phrase), a user's IP address, a user's MAC address, etc.

Figure 2:
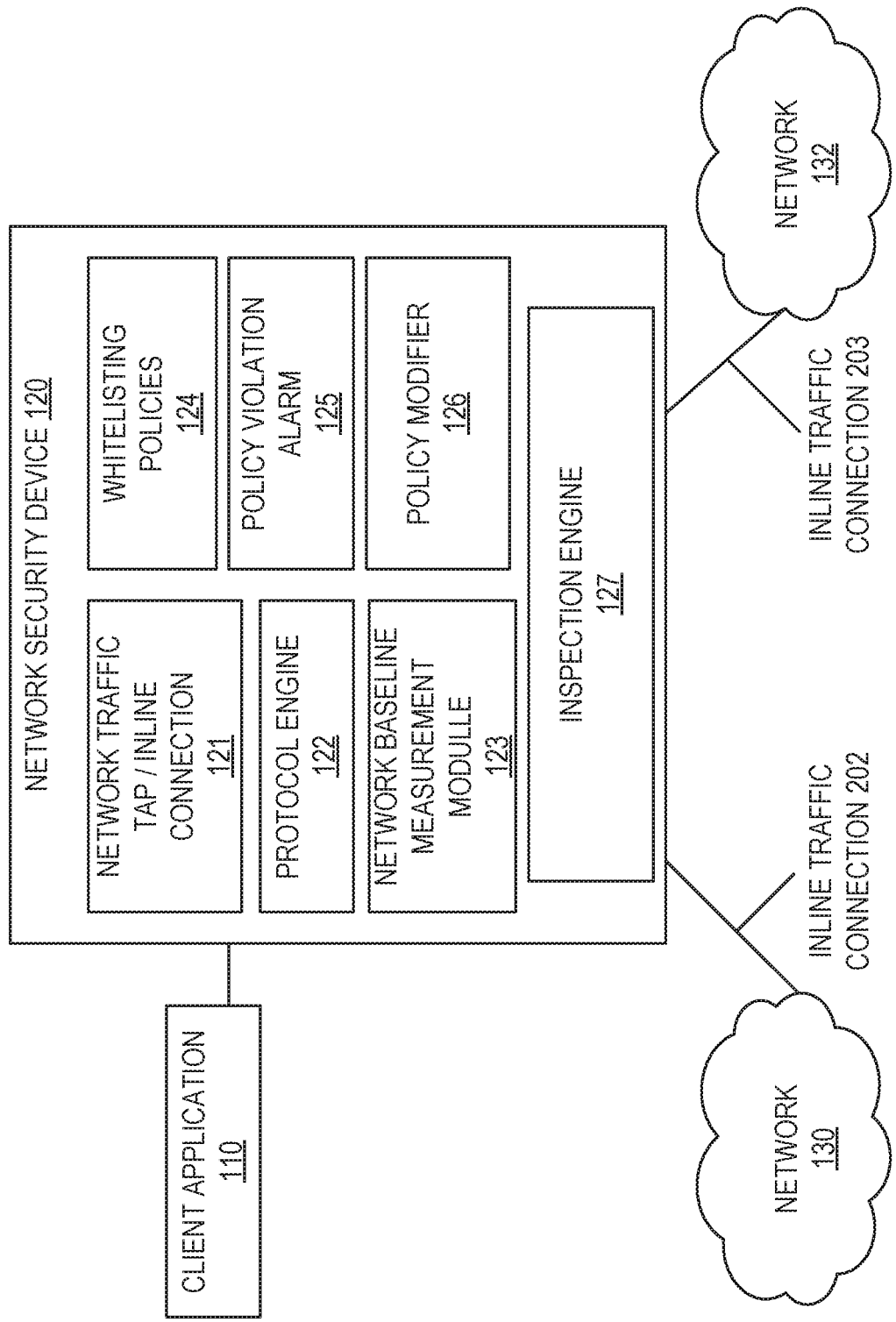
FIG. 2 is a block diagram of another network security device, according to some example embodiments.

FIG. 2 is a block diagram of another network security device 120, according to some example embodiments. FIG. 2 is similar to FIG. 1, however, the network security device 120 is connected to the network 130 and the network 132 via respective inline traffic connections 202 and 203.

Figure 3:
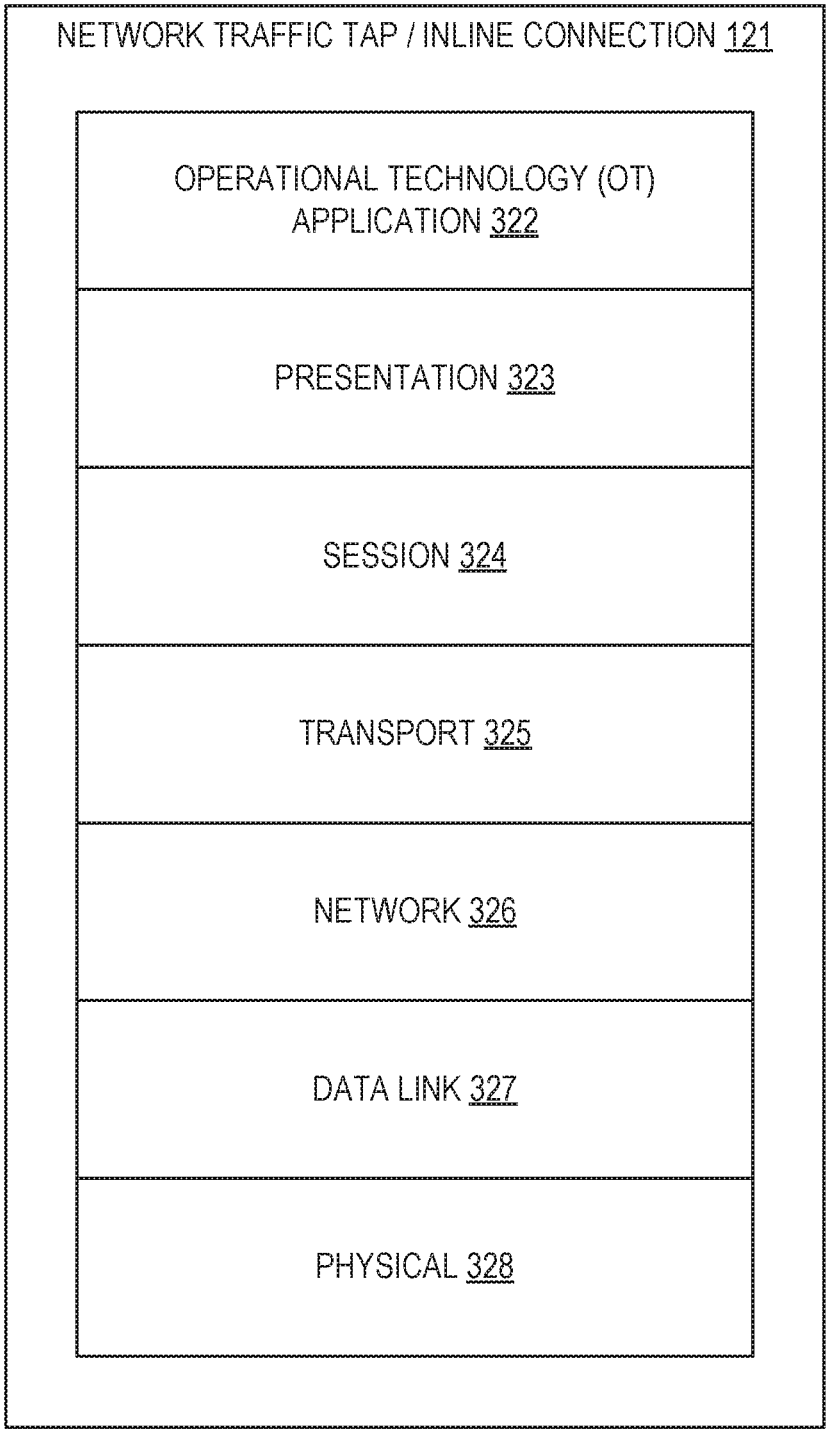
FIG. 3 is a diagram of a network layer stack, according to some example embodiments.

FIG. 3 is a diagram of a network layer stack, according to some example embodiments. The layers in the network layer stack include an OT application layer 322, a presentation layer 323, a session layer 324, a transport layer 325, a network layer 326, a data link layer 327, and a physical layer 328. An example OT protocol borrows some aspects from an IT protocol, but modifies others. For example, the health care Digital Imaging and Communications in Medicine (DICOM) protocol uses a network stack with Ethernet, Internet Protocol, Transmission Control Protocol, and DICOM layers.

Figure 4:
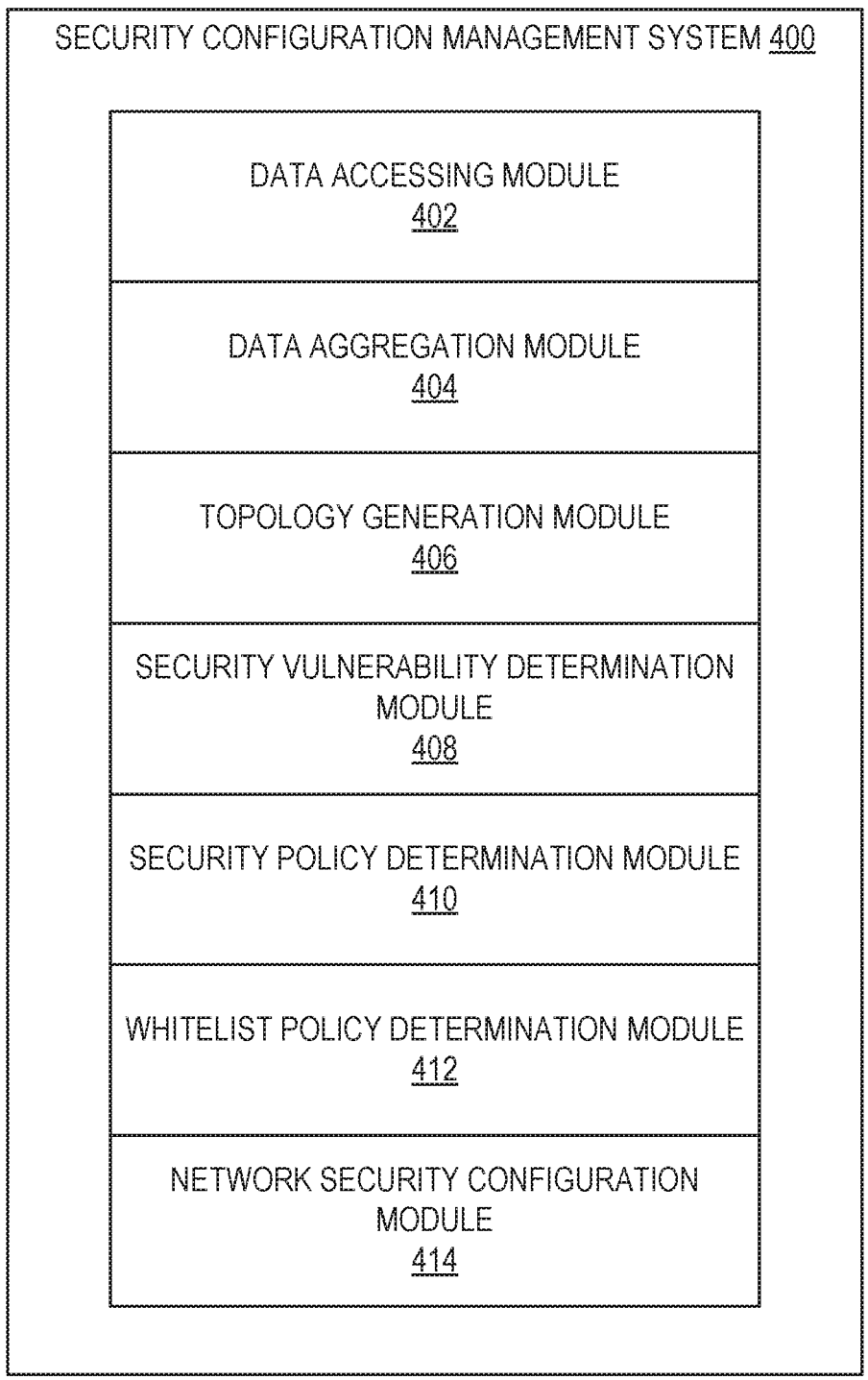
FIG. 4 is a block diagram of a security configuration management system, according to some example embodiments.

FIG. 4 is a block diagram of a security configuration management system 400, according to some example embodiments. To avoid obscuring the inventive subject matter with unnecessary detail, various functional components (e.g., modules) that are not germane to conveying an understanding of the inventive subject matter have been omitted from FIG. 4. However, a skilled artisan will readily recognize that various additional functional components may be supported by the security configuration management system 400 to facilitate additional functionality that is not specifically described herein. Furthermore, the various functional modules depicted in FIG. 4 may reside on a single computing device or may be distributed across several computing devices in various arrangements such as those used in cloud-based architectures.

The security configuration management system 400 automates the process of generating and implementing network security configurations in a network security device 120. In some embodiments, the security configuration management system 400 is separate from the network security device 120. In this type of embodiment, the network security device 120 communicates with the security configuration management system 400 to receive the network security configurations. Alternatively, in some embodiments, the security configuration management system 400 is included in the network security device 120.

As shown, the security configuration management system 400 includes a data accessing module 402, a data aggregation module 404, a topology generation module 406, security vulnerability determination module 408, security policy determination module 410, a whitelist policy determination module 412, and a network security configuration module 414.

The data accessing module 402 accesses network data from multiple data sources. The data sources provide information regarding the network and the devices in the network. For example, products or services that are being used on a network may include data that describe the network topology, such as IP addresses, device types, operating systems, etc. An example of a data source is a software service such as Predix by General Electric. Other examples of data sources are project files of Toolbox ST, Cimplicty, and Proficy by General Electric. The data sources contain a variety of information describing a network and the devices in the network, such as IP addresses, device types, operating system types and versions, version information (firmware/software), active network ports, industrial protocol mechanics, etc. The network data maintained by each of these data sources may be varying and each data source may contain differing information related to the same devices.

The data aggregating module 404 aggregates the accessed network data into an aggregated asset database. Aggregating the network data includes merging data records from multiple data sources that are related to a same device. For example, the data aggregating module matches key data points that identify particular nodes by using associated tables across the multiple data sources. Data records in each table that are identified to be related to a same device are linked in their associated tables. Alternatively, the data aggregation module 404 creates new entries in a new table that include the data gathered from the various data sources.

A simple example of merging data records follows. A first data source provides the following network data:

| PaaS ID | IP Address | Protocol Information |
|---|---|---|
| 0 | 10.0.0.1 | <XML> |
| 1 | 10.0.0.3 | <XML> |
| 2 | 10.0.0.4 | <XML> |

A second data source provides the following network data:

| HMI/SCADA ID | IP Address | Firmware Version |
|---|---|---|
| 0 | 10.0.0.2 | Version x |
| 1 | 10.0.0.3 | Version y |

As shown, the first data source and the second data source have some of the same and some differing fields. For example, the first data source and the second data source both include IP address, however the first data source includes a Paas ID and protocol information, while the second data source includes a HMI/SCADA ID and a firmware version. The data aggregation module 404 uses the matching data fields (i.e., IP address) to identify related data records, which can be merged. For example, both the first data source and the second data source include a data record with the IP address 10.0.0.3. The data aggregation module 404 identifies these two records as being related to the same device and merges the two records into a new data record that includes data from both data sources. This is shown in the following table:

| PaaS ID | HMI/SCADA | IP Address | Protocol Information | Firmware Version |
|---|---|---|---|---|
| 0 | NA | 10.0.0.1 | <XML> | NA |
| NA | 0 | 10.0.0.2 | NA | Version x |
| 1 | 1 | 10.0.0.3 | <XML> | Version y |
| 2 | NA | 10.0.0.4 | <XML> | NA |

As shown, the new merged table includes the data fields (i.e., PaaS ID, HMI/SCADA, IP Address, Protocol Information and Firmware Version) from both the first data source and the second data source. Further, the data record for IP address 10.0.0.3 includes data gathered from both the first and the second data sources.

The topology generation module 406 generates a network topology based on the aggregated asset database. For example, the topology generation module 406 utilizes the aggregated asset database to identify the devices in the network. The topology generation module 406 then groups the identified computing nodes from a networking standpoint based on IP address to identify hosts, networks and subnetworks.

The security vulnerability determination module 408 determines security vulnerabilities based on the aggregated asset database. Known security vulnerabilities include software bugs with security implications. The security vulnerability determination module 408 has access to a vulnerability database that identifies device and software profiles and corresponding known security vulnerabilities. The vulnerability database is compiled based on historical data.

The security vulnerability determination module 408 analyzes the aggregated asset database to identify device and software profiles. This includes information about the individual devices in the network and the software running on the individual devices, such as the software types, versions, etc. The security vulnerability determination module 408 matches the device and software profiles identified from the aggregated asset database to the known device and software profiles in the vulnerability database to identify corresponding security vulnerabilities listed in the vulnerability data. For example, the vulnerability database may list knows device and software profiles and their corresponding security vulnerabilities and the security vulnerability module 408 identifies an exact match from the aggregated asset database to identify the corresponding security vulnerabilities. Alternatively, the vulnerability database may list ranges of known device and software profiles and their corresponding security vulnerabilities. In this type of embodiments, multiple device and software profiles may correspond to the same know security vulnerabilities, for example, multiple versions of the same software may be known to share the same security vulnerabilities. The security vulnerability module 408 uses the device and software profile to identify a matching range of known device and software profiles in the vulnerability database, and then identifies the corresponding security vulnerabilities.

The security policy determination module 410 determines a set of security policies based on the identified security vulnerabilities. The vulnerability database includes recommended security policies corresponding to each known security vulnerability. The security policy determination module 410 uses the recommended security policies in the vulnerability database to generate the set of security policies.

The whitelist policy determination module 412 generates a whitelisting policy. The whitelisting policy identifies data traffic that should be allowed. The whitelist policy determination module 412 analyzes the aggregated asset database to determine the software running on computing node and the interconnections between the computing nodes. The whitelist policy determination module 412 then determines, based on the software and interconnections, which computing nodes are likely to communicate with each other as well as the types of messages and protocols that are likely to be transmitted amongst the computing nodes to provide corresponding software service. The whitelist policy determination module 412 uses this data to generate a whitelisting policy that allows the identified messages between the identified computing nodes.

The network security configuration module 414 generates and implements network security configuration for a network security device 120. The network security configuration module 414 generates the network security configurations based on the determined network topology, security policies and the whitelisting policies. The network security configuration module 414 then implements the generated network security configurations on an appropriate network security device 120. For example, in embodiments where the security configuration management system 400 is separate from the network security device 120, the network security configuration module 414 transmits the network security configurations to the network security device 120. Alternatively, in embodiments where the security configuration management system 400 is included in the network security device 120, the network security configuration module 414 causes the network security device 120 to operate according to the generated network security configurations.

Figure 5:
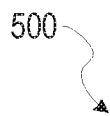
FIG. 5 is a flowchart illustrating a method for automated network security configuration, according to certain example embodiments.
Figure 5:
Figure 5:
Figure 5:
Figure 5:
Figure 5:

FIG. 5 is a flowchart illustrating a method 500 for automated network security policy configuration, according to certain example embodiments. The method 500 may be embodied in computer-readable instructions for execution by one or more computer processors such that the operations of the method 500 may be performed in part or in whole by the security configuration management system 400, accordingly, the method 500 is described below by way of example with reference thereto. However, it shall be appreciated that at least some of the operations of the method 500 may be deployed on various other hardware configurations and the method 500 is not intended to be limited to the security configuration management system 400.

At operation 502, the data accessing module 402 accesses network data from data sources. The data sources provide information regarding the network and the devices in the network. For example, products or services that are being used on a network may include data that describe the network topology, such as IP addresses, device types, operating systems, etc. An example of a data source is a software service such as Predix by General Electric. Other examples of data sources are project files of Toolbox ST, Cimplicty, and Proficy by General Electric. The data sources contain a variety of information describing a network and the devices in the network, such as IP addresses, device types, operating system types and versions, version information (firmware/software), active network ports, industrial protocol mechanics, etc. The network data maintained by each of these data sources may be varying and each data source may contain differing information related to the same devices.

The data accessing module 402 has access to these data sources and gathers data from each data source. This includes initially gathering data from the data sources at one time, as well as periodically updating the gathered data from each data source. For example, example, the data accessing module 402 may request updated data from each data source periodically or according to a predetermined schedule.

At operation 504, the data aggregation module 404 generates an aggregated asset database. The aggregated asset database includes data from each of the data sources. The aggregation module 404 merges data records to include data fields from each data source, as well as to merge data records that are related to the same device into a single record. For example, the aggregation module 404 merges data records from two different sources that share a common IP address into a single merged data record. This new merged data record includes the data from each of the data sources. Generating the aggregated asset database is discussed in greater detail below in relation to FIG. 6.

At operation 506, the security policy determination module 410 determines a set of security policies. The set of security policies define rules to be enforced by a network security device 120 in relation to data traffic received by the network security device 120. For example, the set of security policies may define rules for inspecting data traffic and whether traffic should be blocked, allowed, etc. In some embodiments, the set of security policies are determined based on a set of security vulnerabilities. For example, the set of security policies are selected based on a set of known security vulnerabilities in the network. Determining the set of security policies is discussed in greater detail below in relation to FIG. 7.

At operation 508, the whitelist policy determination module 412 determines whitelist policies. The whitelisting policy identifies data traffic that should be allowed. The whitelist policy determination module 412 analyzes the aggregated asset database to determine the software running on computing node and the interconnections between the computing nodes. The whitelist policy determination module 412 then determines, based on the software and interconnections, which computing nodes are likely to communicate with each other as well as the types of messages and protocols that are likely to be transmitted amongst the computing nodes to provide corresponding software service. The whitelist policy determination module 412 uses this data to generate a whitelisting policy that allows the identified messages between the identified computing nodes. Determining the whitelist policies is discussed in greater detail below in relation to FIG. 8.

At operation 510, the networking security configuration module generates network security policy configurations for the network security device 120. The network security configuration module 414 generates the network security configurations based on the determined network topology, security policies and the whitelisting policies. For example, the network security configurations include the set of security policies and the whitelisting policies.

At operation 512, the network security configuration module 414 implements the network security configurations on the network security device 120. In embodiments where the security configuration management system 400 is separate from the network security device 120, the network security configuration module 414 transmits the network security configurations to the network security device 120. Alternatively, in embodiments where the security configuration management system 400 is included in the network security device 120, the network security configuration module 414 causes the network security device 120 to operate according to the generated network security configurations.

Figure 6:
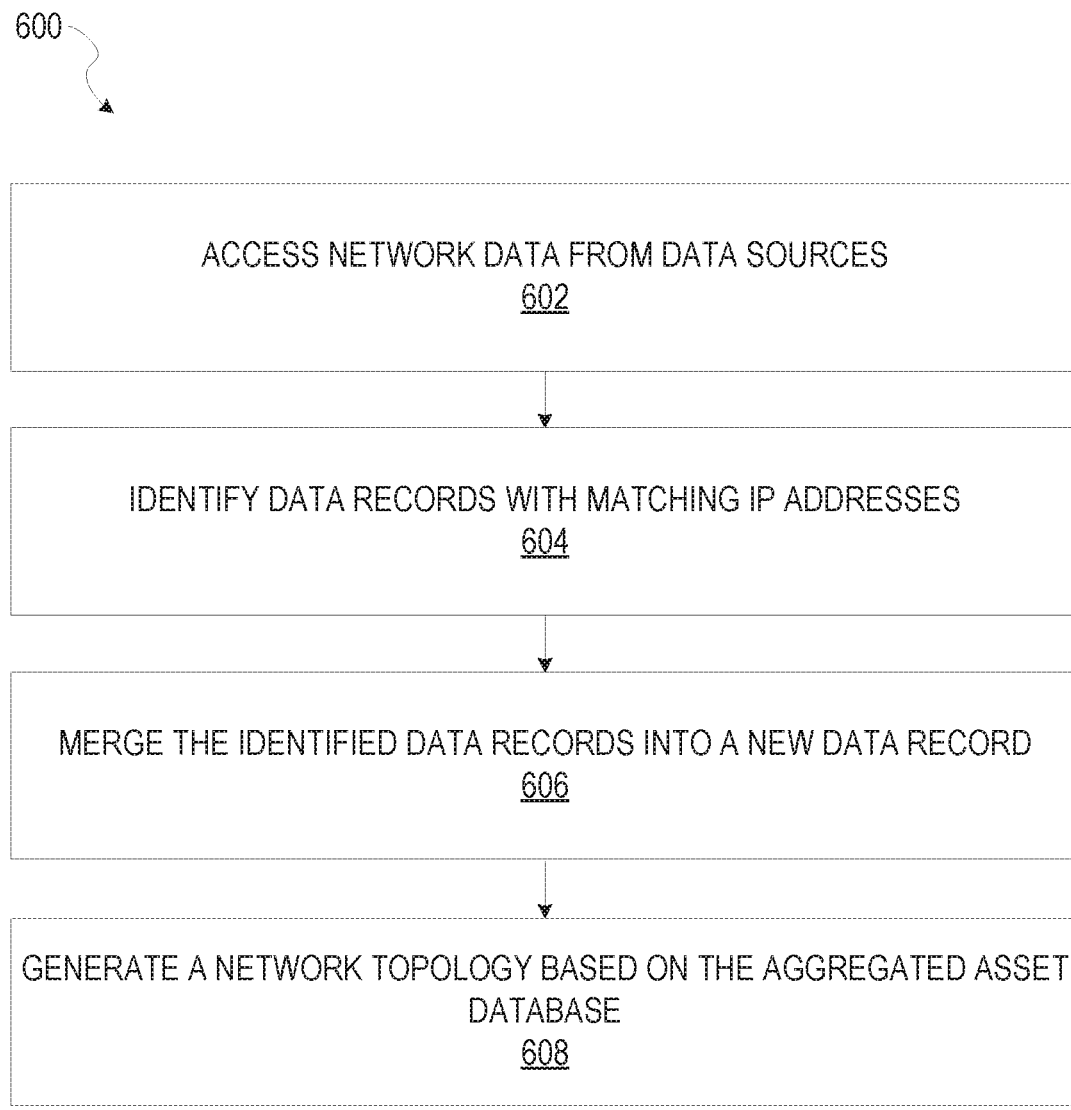
FIG. 6 is a flowchart illustrating a method for generating an aggregated asset database, according to certain example embodiments.

FIG. 6 is a flowchart illustrating a method 600 for generating an aggregated asset database, according to certain example embodiments. The method 600 may be embodied in computer-readable instructions for execution by one or more computer processors such that the operations of the method 600 may be performed in part or in whole by the security configuration management system 400; accordingly, the method 600 is described below by way of example with reference thereto. However, it shall be appreciated that at least some of the operations of the method 600 may be deployed on various other hardware configurations and the method 600 is not intended to be limited to the security configuration management system 400.

At operation 602, the data accessing module 402 accesses network data from data sources. The data sources provide information regarding the network and the devices in the network. For example, products or services that are being used on a network may include data that describe the network topology, such as IP addresses, device types, operating systems, etc. An example of a data source is a software service such as Predix by General Electric. Other examples of data sources are project files of Toolbox ST, Cimplicty, and Proficy by General Electric. The data sources contain a variety of information describing a network and the devices in the network, such as IP addresses, device types, operating system types and versions, version information (firmware/software), active network ports, industrial protocol mechanics, etc. The network data maintained by each of these data sources may be varying and each data source may contain differing information related to the same devices.

The data accessing module 402 has access to these data sources and gathers data from each data source. This includes initially gathering data from the data sources at one time, as well as periodically updating the gathered data from each data source. For example, example, the data accessing module 402 may request updated data from each data source periodically or according to a predetermined schedule.

At operation 604, the data aggregation module 404 identifies data records with matching IP addresses. Data records in from different data sources may be related to the same device, group of devices, etc. Accordingly, the data aggregation module 404 identifies data records with matching data that uniquely identifies a device or group of devices, such as IP addresses, unique device identifiers, etc.

At operation 606, the data aggregation module 404 merges the identified data records into a new data record. For example, the data aggregation module 404 generates a new data record that includes the matching IP address as well as the other data from the respective identified data records from each data source. As another example, the data aggregation module 404 links the identified data records with matching IP addresses. For example, the data aggregation module 404 adds an identifier or link to each of the identified data records that identifies the other data records that have the matching IP address.

At operation 608, the topology generation module 406 generates a network topology based on the aggregated asset database. For example, the topology generation module 406 utilizes the aggregated asset database to identify the devices in the network. The topology generation module 406 then groups the identified computing nodes from a networking standpoint based on IP address to identify hosts, networks and subnetworks.

Figure 7:
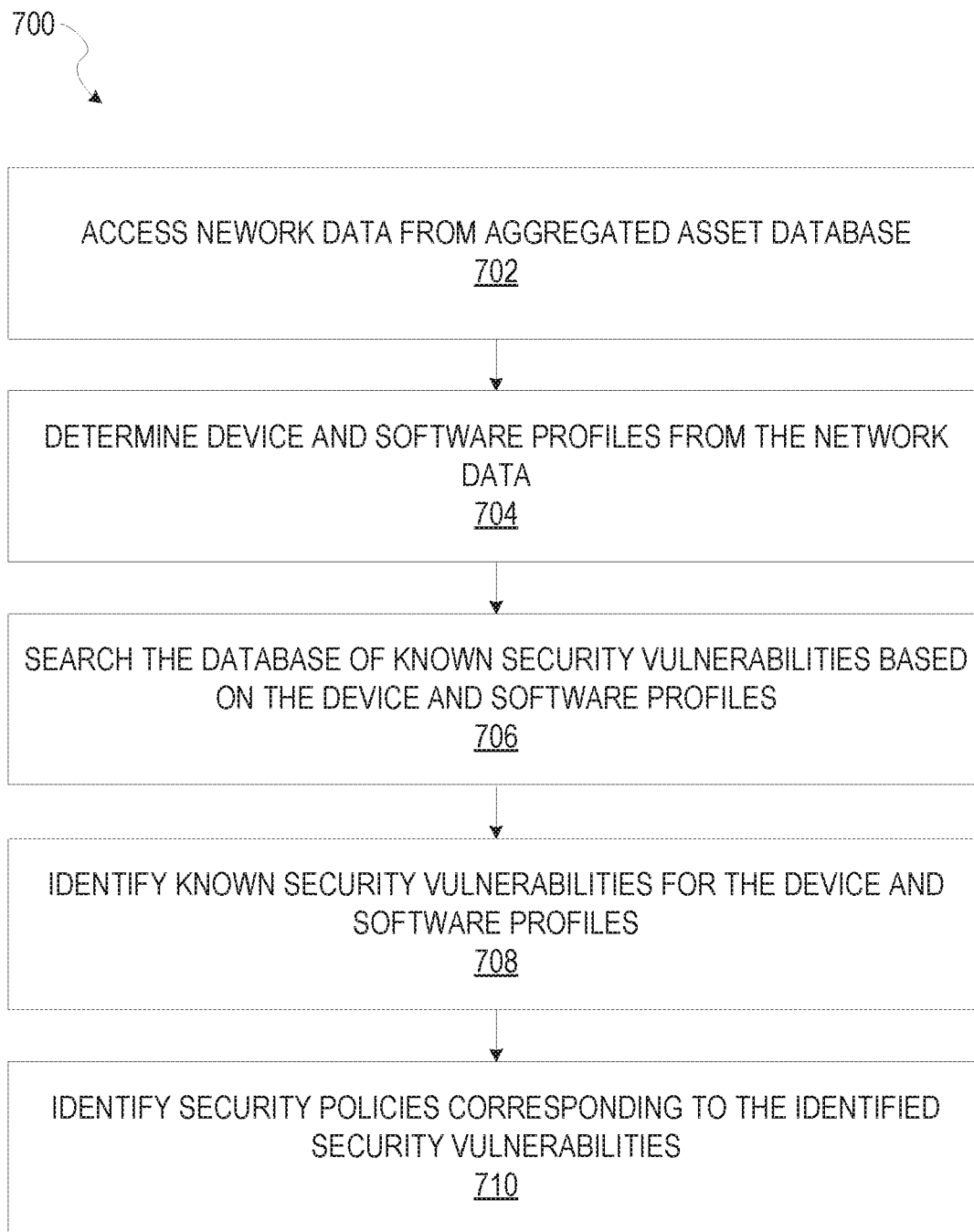
FIG. 7 is a flowchart illustrating a method for generating a set of security policies, according to certain example embodiments.

FIG. 7 is a flowchart illustrating a method 700 for generating a set of security policies, according to certain example embodiments. The method 700 may be embodied in computer-readable instructions for execution by one or more computer processors such that the operations of the method 700 may be performed in part or in whole by the security configuration management system 400; accordingly, the method 700 is described below by way of example with reference thereto. However, it shall be appreciated that at least some of the operations of the method 700 may be deployed on various other hardware configurations and the method 700 is not intended to be limited to the security configuration management system 400.

At operation 702, the security vulnerability determination module 408 accesses network data from the aggregated asset database. The aggregated asset database includes network data from multiple data sources that has been aggregated to match related data records. The network data describes devices in a network and the interconnections between the devices.

At operation 704, the security vulnerability determination module 408 determines device and software profiles from the network data. A device and software profile describes a combination of device type and corresponding software running on the device. This can include version, type, device, model, operation system, etc. Further, a device and software profile may relate to a single device or a group of devices.

At operation 706, the security vulnerability determination module 408 searches the database of known security vulnerabilities based on the device and software profiles. The database of known security vulnerabilities lists device and software profiles and corresponding known security vulnerabilities. Known security vulnerabilities include software bugs with security implications. The vulnerability database is compiled based on historical data. The security vulnerability determination module 408 searches the database of known security vulnerabilities for device and software profiles that match the identified device and software profiles from the aggregated asset database.

At operation 708, the security policy determination module 408 identifies security vulnerabilities for the device and software profiles. For each matching device and software profile identified in the database of known security vulnerabilities, the security policy determination module 408 identifies the corresponding software vulnerabilities listed in the database of known security vulnerabilities.

At operation 710, the security policy determination module 408 identifies security policies corresponding to the identified security vulnerabilities. The database of known security vulnerabilities includes recommended security policies corresponding to each known security vulnerability. The security policy determination module 410 uses the recommended security policies in the vulnerability database to generate the set of security policies.

Figure 8:
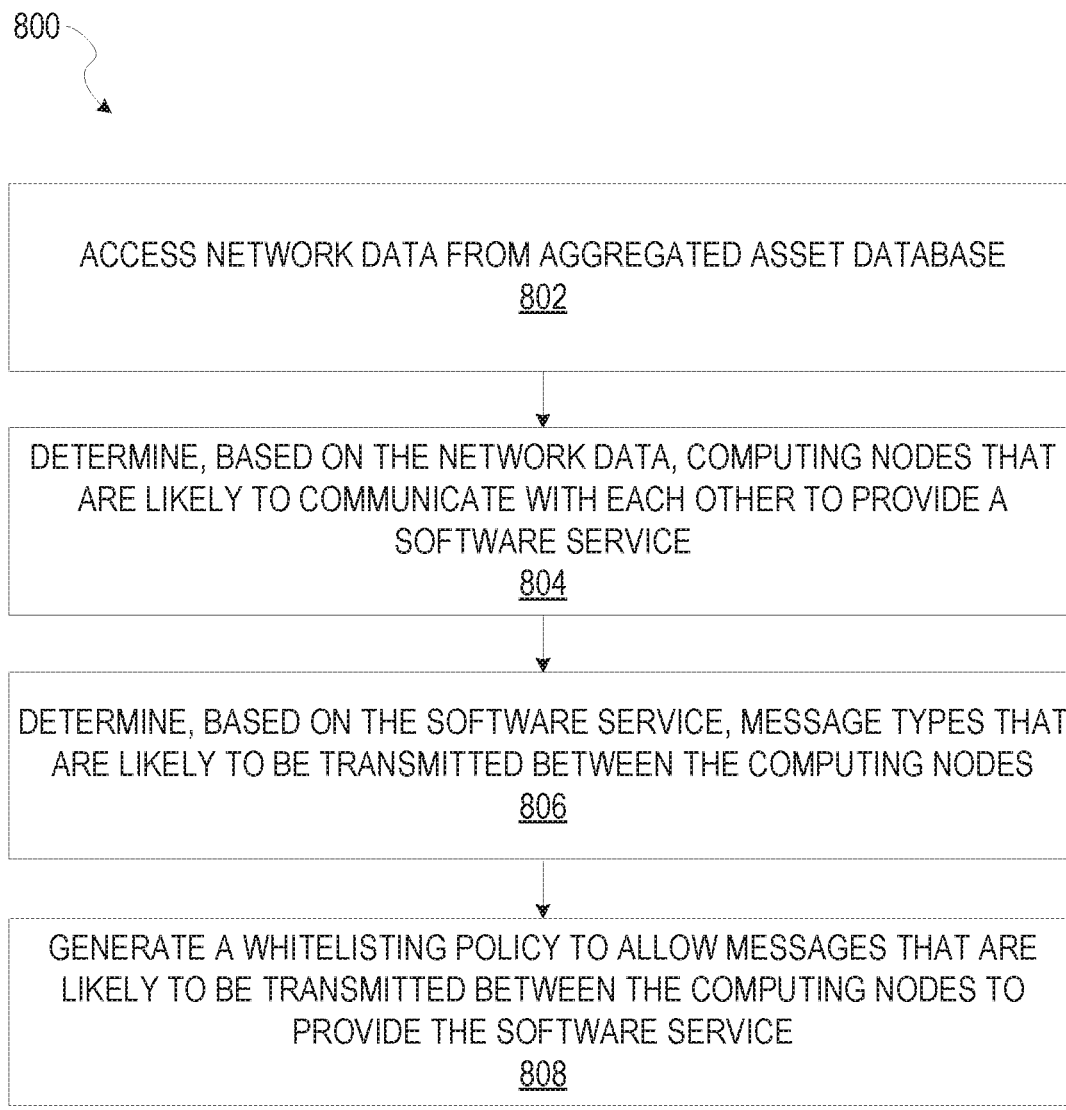
FIG. 8 is a flowchart illustrating a method for whitelisting policies, according to certain example embodiments.

FIG. 8 is a flowchart illustrating a method 800 for determining whitelisting policies, according to certain example embodiments. The method 800 may be embodied in computer-readable instructions for execution by one or more computer processors such that the operations of the method 800 may be performed in part or in whole by the security configuration management system 400; accordingly, the method 800 is described below by way of example with reference thereto. However, it shall be appreciated that at least some of the operations of the method 800 may be deployed on various other hardware configurations and the method 800 is not intended to be limited to the security configuration management system 400.

At operation 802, the whitelist policy determination module 412 accesses network data from the aggregated asset database. The aggregated asset database includes network data from multiple data sources that has been aggregated to match related data records. The network data describes devices in a network and the interconnections between the devices.

At operation 804, the whitelist policy determination module 412 determines, based on the network data, computing nodes that are likely to communicate with each other to provide a software service. For example, the whitelist policy determination module 412 determines, based on the software running on the computing nodes and the interconnection between the computing nodes, which computing nodes are likely to communicate with each other to provide specific services on the software.

At operation 806, the whitelist policy determination module 412 determines, based on the software service, message types that are likely to be transmitted between the computing nodes. Once the whitelist policy determination module 412 determines the services provided by the various computing nodes, the whitelist policy determination module 412 determines the types of messages that are likely to be transmitted as part of the service, such as read messages, write messages, messages in specific protocols or API calls, etc.

At operation 808, the whitelist policy determination module 412 generates a whitelisting policy to allow messages that are likely to be transmitted between the computing nodes to provide the software service. For example, the whitelist policy identifies the computing nodes and indicates the specific message types, protocols, etc., that should be allowed to be transmitted between the computing nodes to provide the service.

Example Software Architecture

Figure 9:
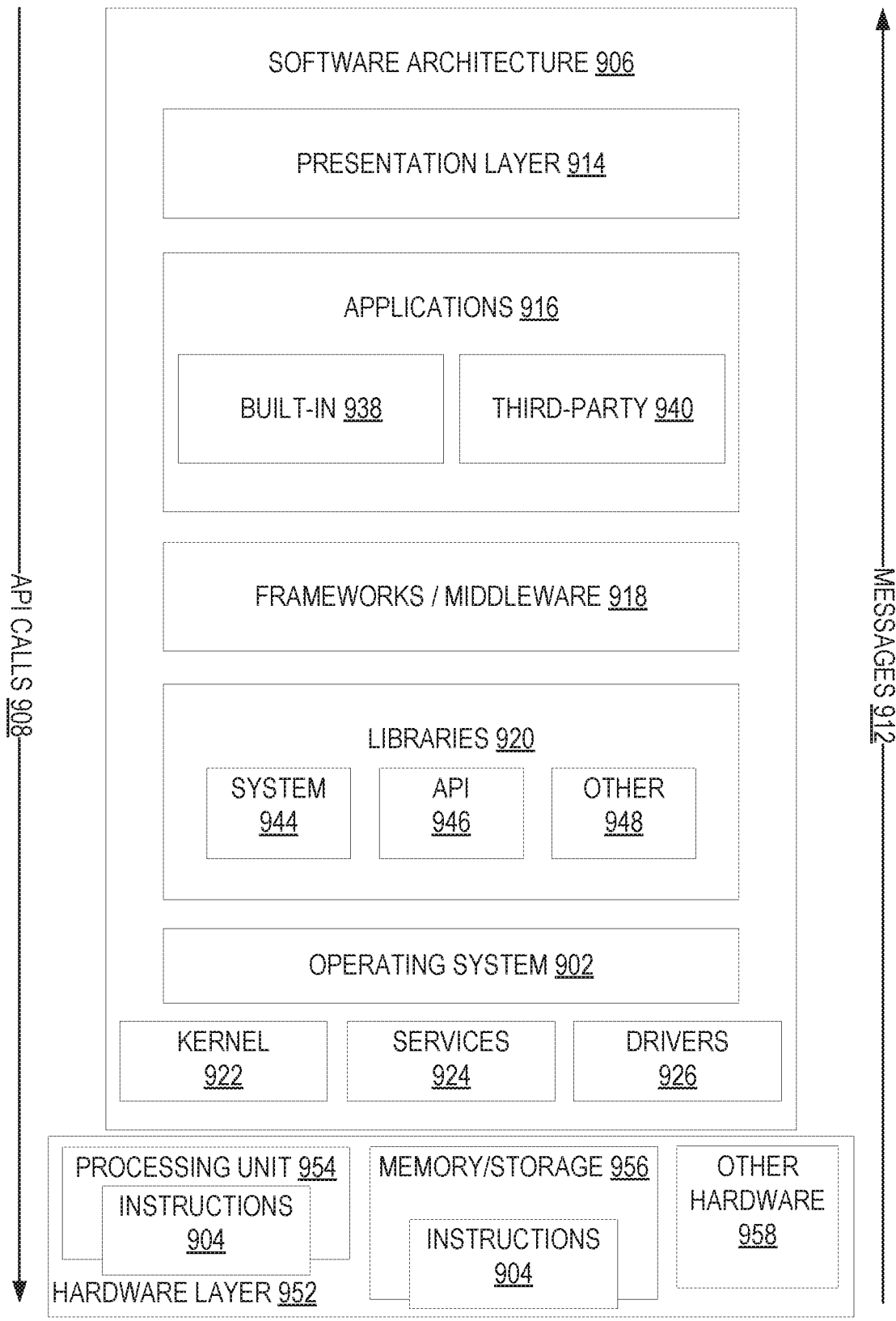
FIG. 9 is a block diagram illustrating an example software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, applications 916 and a presentation layer 914. Operationally, the applications 916 and/or other components within the layers may invoke Application Programming Interface (API) calls 908 through the software stack and receive a response 912 as in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create user interfaces to interact with users of the system. Alternatively, or additionally, in some systems interactions with a user may occur through a presentation layer, such as presentation layer 914. In these systems, the application/component "logic" can be separated from the aspects of the application/component that interact with a user.

Example Machine Architecture and
Machine-Readable Medium

Figure 10:
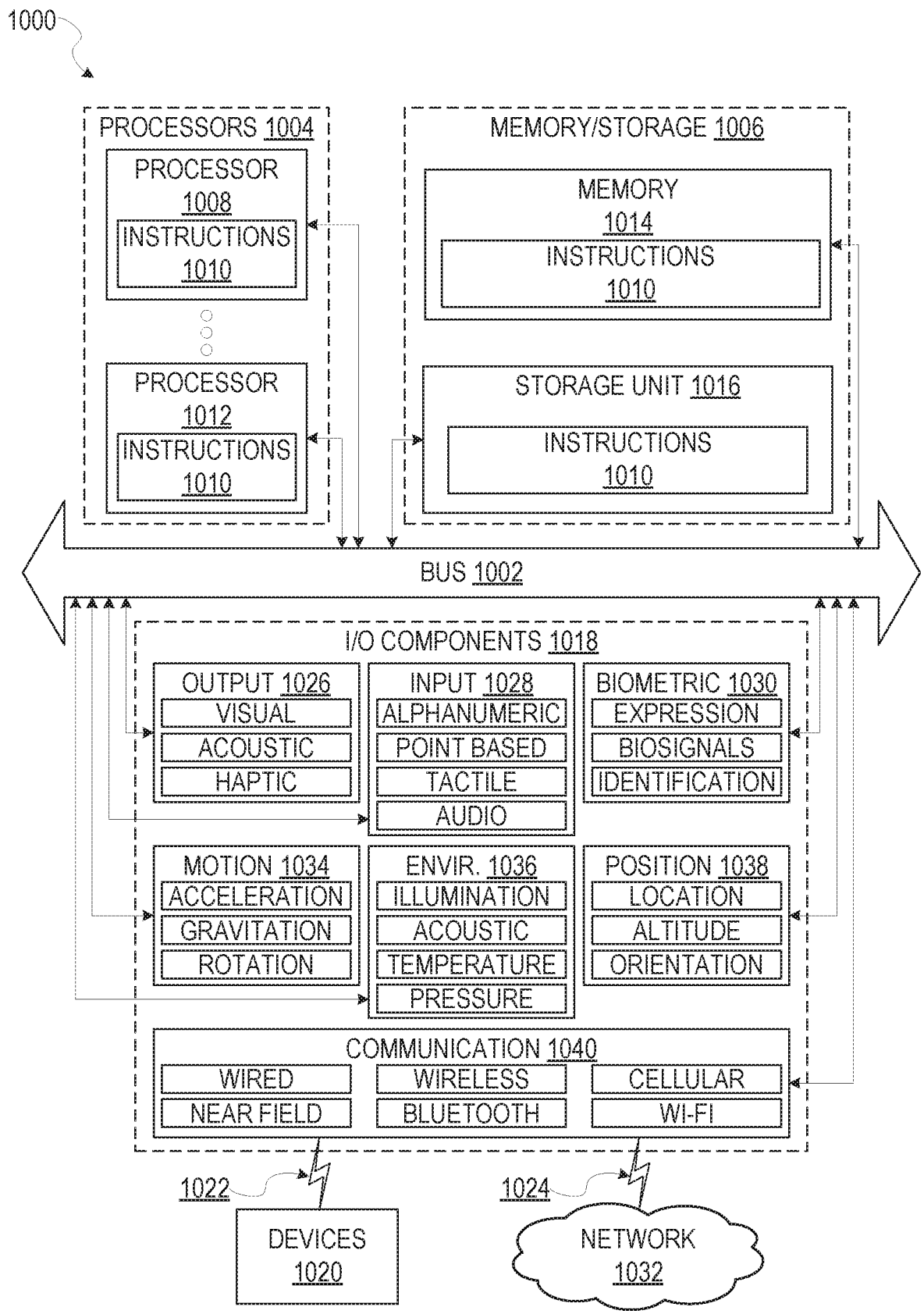
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1022 and coupling 1024, respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via IP geo-location, location via Wi-Fi® signal triangulation, location via detecting a NFC beacon signal that may indicate a particular location, and so forth.

Transmission Medium

In various example embodiments, one or more portions of the network 1032 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1032 or a portion of the network 1032 may include a wireless or cellular network and the coupling 1024 may be a Code Division Multiple Access (CDMA) connection, a Global System for Mobile communications (GSM) connection, or another type of cellular or wireless coupling. In this example, the coupling 1024 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 1010 may be transmitted or received over the network 1032 using a transmission medium via a network interface device (e.g., a network interface component included in the communication components 1040) and utilizing any one of a number of well-known transfer protocols (e.g., HTTP). Similarly, the instructions 1010 may be transmitted or received using a transmission medium via the coupling 1022 (e.g., a peer-to-peer coupling) to the devices 1020. The term "transmission medium" shall be taken to include any intangible medium that is capable of storing, encoding, or carrying the instructions 1010 for execution by the machine 1000, and includes digital or analog communications signals or other intangible media to facilitate communication of such software.

Operational Technology Vs. Information Technology

Example operational technology systems are industrial control systems (ICS), including supervisory control and data acquisition (SCADA) and distributed control systems (DCS).

In some embodiments of operational technology networks, one or more of the following applies.

1) Operational technology systems are relatively static with few exploit variants and few technology stacks. By contrast, information technology systems have fluid, intertwined technology stacks with an incredible number of exploit variants.

2) Operational technology systems are directed to process control and manual manipulation of the physical world. By contrast, information technology systems are directed to digital information storage, retrieval, transmission, and manipulation.

3) Operational technology systems prioritize, in order from most to least important, control, availability, integrity, and confidentiality. Because operational technology manipulates the physical world, control equates to safety, and availability of physical resources is more important than integrity and confidentiality. By contrast, information technology systems prioritize, in order from most to least important, confidentiality integrity and availability, and do not prioritize control.

4) In operational technology systems, throughput is secondary. By contrast, in information technology systems, throughput is important and bandwidth demand grows more quickly.

5) With operational technology systems, a negative impact such as a disruption or slowdown is not permissible due to the effect on real-time or deterministic operation—even despite security concerns. By contrast, in information technology systems, security patching that affects performance is acceptable.

6) Operational technology systems rely on whitelisting more than information technology systems do. Blacklisting, often using in information technology, requires vendors to continually look for and resolve vulnerabilities based on threats and exploits and requires regular malware scans that affect availability.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computerized method comprising:
   accessing, from two or more data sources, network data gathered from a network, the network including nodes, the network data including Internet Protocol (IP) addresses, device types and software used in the network;
   wherein the network data includes a first table and a second table;
   aggregating, using one or more hardware processors, the network data, yielding an aggregated asset database, wherein the aggregating performs a single operation that identifies a first field in the first table that matches a second field in the second table, and when first field matches the second field, identifies related data records that can be merged, the related data records both being from a first device and having the same IP address;
   generating, using the one or more hardware processors and based on the aggregated asset database, a network topology describing computing nodes in the network and interconnections between the computing nodes in the network;
   determining, using the one or more hardware processors and based on the aggregated asset database and a database of known security vulnerabilities corresponding to device and software profiles, a set of security vulnerabilities for the network, wherein the database of known vulnerabilities is compiled based upon historical data and wherein the determining analyzes the aggregated asset database to identify a device and software profile of the first device, and then matches the device and software profile of the first device found in the aggregated asset database to a known device and software profile in the database of known vulnerabilities, wherein the known device and software profile relates to a first device;
   determining a set of security policies for the network based on the set of security vulnerabilities, wherein the generating creates a whitelisting policy of data traffic that is to be allowed, the whitelisting policy based upon an analysis of whether nodes in the entire network are likely to communicate with each other and the types of messages types or protocols that are likely to be transmitted amongst the nodes;

generating, using the one or more hardware processors, network security configurations for the network based on the network topology and the set of security policies; and at least initiating implementation of the network security configurations on a network security device in the network.

2. The computerized method of claim 1, wherein generating the network topology comprises:

identifying, based on the IP addresses, a first subnetwork and a second subnetwork included in the network.

3. The computerized method of claim 1, wherein aggregating the network data comprises:

identifying, based on the network data, a first data record from a first data source and a second data record from a second source that contain a matching IP address, the first data record including at least one data item not included in the second data record; and merging the first data record and the second data record, yielding a new data record that includes at least the matching IP address and the at least one data item not included in the second data record.

4. The computerized method of claim 1, wherein determining the set of security vulnerabilities for the network comprises:

searching the database of known security vulnerabilities based on a device and software profile identified from the aggregated asset database, yielding a first search;

determining, based on the first search, a record in the database of known security vulnerabilities that matches the device and software profile identified from the aggregated asset database; and identifying, based on the record, a known security vulnerability that corresponds to the device and software profile identified from the aggregated asset database.

5. The computerized method of claim 4, wherein the record further includes a security policy corresponding to the known security vulnerability.

6. The computerized method of claim 5, wherein determining the set of security policies for the network comprises:

identifying, based on the record, the security policy corresponding to the known security vulnerability.

7. The computerized method of claim 1, further comprising:

determining, based on device and software profiles identified from the aggregated asset database, that a first computing node in the network is likely to communicate with a second computing node in the network to provide a first service;

determine, based on the first service, a set of message types that are likely to be transmitted between the first computing node and the second computing node to provide the first service; and further generating the whitelisting policy for communications between the first computing node and the second computing node based on the set of message types that are likely to be transmitted between the first computing node and the second computing node to provide the service, wherein the whitelisting policy is included in the network security configurations.

8. A security configuration management system comprising:

one or more computer processors; and one or more non-transitory computer-readable mediums storing instructions that, when executed by the one or more computer processors, cause the security configuration management system to perform operations comprising:

accessing, from two or more data sources, network data gathered from a network, the network including nodes, the network data including Internet Protocol (IP) addresses, device types and software used in the network;

wherein the network data includes a first table and a second table;

aggregating the network data, yielding an aggregated asset database, wherein the aggregating performs a single operation that identifies a first field in the first table that matches a second field in the second table, and when first field matches the second field, identifies related data records that can be merged, the related data records both being from a first device and having the same IP address;

generating, based on the aggregated asset database, a network topology describing computing nodes in the network and interconnections between the computing nodes in the network;

determining, based on the aggregated asset database and a database of known security vulnerabilities corresponding to device and software profiles, a set of security vulnerabilities for the network, wherein the database of known vulnerabilities is compiled based upon historical data and wherein the determining analyzes the aggregated asset database to identify a device and software profile of the first device, and then matches the device and software profile of the first device found in the aggregated asset database to a known device and software profile in the database of known vulnerabilities, wherein the known device and software profile relates to a first device;

determining a set of security policies for the network based on the set of security vulnerabilities, wherein the generating creates a whitelisting policy of data traffic that is to be allowed, the whitelisting policy based upon an analysis of whether nodes in the entire network are likely to communicate with each other and the types of messages types or protocols that are likely to be transmitted amongst the nodes;

generating network security configurations for the network based on the network topology and the set of security policies; and at least initiating implementation of the network security configurations on a network security device in the network.

9. The security configuration management system of claim 8, wherein generating the network topology comprises:

identifying, based on the IP addresses, a first subnetwork and a second subnetwork included in the network.

10. The security configuration management system of claim 8, wherein aggregating the network data comprises:

identifying, based on the network data, a first data record from a first data source and a second data record from a second source that contain a matching IP address, the first data record including at least one data item not included in the second data record; and merging the first data record and the second data record, yielding a new data record that includes at least the matching IP address and the at least one data item not included in the second data record.

11. The security configuration management system of claim 8, wherein determining the set of security vulnerabilities for the network comprises:
   searching the database of known security vulnerabilities based on a device and software profile identified from the aggregated asset database, yielding a first search;
   determining, based on the first search, a record in the database of known security vulnerabilities that matches the device and software profile identified from the aggregated asset database; and
   identifying, based on the record, a known security vulnerability that corresponds to the device and software profile identified from the aggregated asset database.

12. The security configuration management system of claim 11, wherein the record further includes a security policy corresponding to the known security vulnerability.

13. The security configuration management system of claim 12, wherein determining the set of security policies for the network comprises:
   identifying, based on the record, the security policy corresponding to the known security vulnerability.

14. The security configuration management system of claim 8, the operations further comprising:
   determining, based on device and software profiles identified from the aggregated asset database, that a first computing node in the network is likely to communicate with a second computing node in the network to provide a first service;
   determine, based on the first service, a set of message types that are likely to be transmitted between the first computing node and the second computing node to provide the first service; and
   further generating the whitelisting policy for communications between the first computing node and the second computing node based on the set of message types that are likely to be transmitted between the first computing node and the second computing node to provide the service, wherein the whitelisting policy is included in the network security configurations.

15. A non-transitory computer-readable medium storing instructions that, when executed by one or more computer processors of a security configuration management system, cause the security configuration management system to perform operations comprising:
   accessing, from two or more data sources, network data gathered from a network, the network including nodes, the network data including Internet Protocol (IP) addresses, device types and software used in the network;
   wherein the network data includes a first table and a second table;
   aggregating, using one or more hardware processors, the network data, yielding an aggregated asset database, wherein the aggregating performs a single operation that identifies a first field in the first table that matches a second field in the second table, and when first field matches the second field, identifies related data records that can be merged, the related data records both being from a first device and having the same IP address;
   generating, using the one or more hardware processors and based on the aggregated asset database, a network topology describing computing nodes in the network and interconnections between the computing nodes in the network;
   determining, using the one or more hardware processors and based on the aggregated asset database and a database of known security vulnerabilities corresponding to device and software profiles, a set of security vulnerabilities for the network, wherein the database of known vulnerabilities is compiled based upon historical data and wherein the determining analyzes the aggregated asset database to identify a device and software profile of the first device, and then matches the device and software profile of the first device found in the aggregated asset database to a known device and software profile in the database of known vulnerabilities, wherein the known device and software profile relates to a first device;
   determining a set of security policies for the network based on the set of security vulnerabilities, wherein the generating creates a whitelisting policy of data traffic that is to be allowed, the whitelisting policy based upon an analysis of whether nodes in the entire network are likely to communicate with each other and the types of messages types or protocols that are likely to be transmitted amongst the nodes;
   generating, using the one or more hardware processors, network security configurations for the network based on the network topology and the set of security policies; and
   at least initiating implementation of the network security configurations on a network security device in the network.

16. The non-transitory computer-readable medium of claim 15, wherein generating the network topology comprises:
   identifying, based on the IP addresses, a first subnetwork and a second subnetwork included in the network.

17. The non-transitory computer-readable medium of claim 15, wherein aggregating the network data comprises:
   identifying, based on the network data, a first data record from a first data source and a second data record from a second source that contain a matching IP address, the first data record including at least one data item not included in the second data record; and
   merging the first data record and the second data record, yielding a new data record that includes at least the matching IP address and the at least one data item not included in the second data record.

18. The non-transitory computer-readable medium of claim 15, wherein determining the set of security vulnerabilities for the network comprises:
   searching the database of known security vulnerabilities based on a device and software profile identified from the aggregated asset database, yielding a first search;
   determining, based on the first search, a record in the database of known security vulnerabilities that matches the device and software profile identified from the aggregated asset database; and
   identifying, based on the record, a known security vulnerability that corresponds to the device and software profile identified from the aggregated asset database.

19. The non-transitory computer-readable medium of claim 18, wherein the record further includes a security policy corresponding to the known security vulnerability and determining the set of security policies for the network comprises:

identifying, based on the record, the security policy corresponding to the known security vulnerability.

20. The non-transitory computer-readable medium of claim 15, the operations further comprising:
  determining, based on device and software profiles identified from the aggregated asset database, that a first computing node in the network is likely to communicate with a second computing node in the network to provide a first service;
  determine, based on the first service, a set of message types that are likely to be transmitted between the first computing node and the second computing node to provide the first service; and
  further generating the whitelisting policy for communications between the first computing node and the second computing node based on the set of message types that are likely to be transmitted between the first computing node and the second computing node to provide the service, wherein the whitelisting policy is included in the network security configurations.

21. A system comprising:
  one or more processors;
  a network, the network including nodes;
  two or more data sources coupled to the network, the two or more data sources storing network data gathered from the network, the network data including Internet Protocol (IP) addresses, device types and software used in the network, the network data including a first table and a second table;
  by the one or more processors:
    accessing, from the two or more data sources, the network data;
    aggregating, using one or more hardware processors, the network data, yielding an aggregated asset database, wherein the aggregating performs a single operation that identifies a first field in the first table that matches a second field in the second table, and when first field matches the second field, identifies related data records that can be merged, the related data records both being from a first device and having the same IP address;
    generating, using the one or more hardware processors and based on the aggregated asset database, a network topology describing computing nodes in the network and interconnections between the computing nodes in the network;
    determining, using the one or more hardware processors and based on the aggregated asset database and a database of known security vulnerabilities corresponding to device and software profiles, a set of security vulnerabilities for the network, wherein the database of known vulnerabilities is compiled based upon historical data and wherein the determining analyzes the aggregated asset database to identify a device and software profile of the first device, and then matches the device and software profile of the first device found in the aggregated asset database to a known device and software profile in the database of known vulnerabilities, wherein the known device and software profile relates to a first device;
    determining a set of security policies for the network based on the set of security vulnerabilities, wherein the generating creates a whitelisting policy of data traffic that is to be allowed, the whitelisting policy based upon an analysis of whether nodes in the entire network are likely to communicate with each other and the types of messages types or protocols that are likely to be transmitted amongst the nodes;
    generating network security configurations for the network based on the network topology and the set of security policies; and
    at least initiating implementation of the network security configurations on a network security device in the network.

22. The system of claim 21, wherein generating the network topology comprises:
  identifying, based on the IP addresses, a first subnetwork and a second subnetwork included in the network.

23. The system of claim 21, wherein aggregating the network data comprises:
  identifying, based on the network data, a first data record from a first data source and a second data record from a second source that contain a matching IP address, the first data record including at least one data item not included in the second data record; and
  merging the first data record and the second data record, yielding a new data record that includes at least the matching IP address and the at least one data item not included in the second data record.

24. The system of claim 21, wherein determining the set of security vulnerabilities for the network comprises:
  searching the database of known security vulnerabilities based on a device and software profile identified from the aggregated asset database, yielding a first search;
  determining, based on the first search, a record in the database of known security vulnerabilities that matches the device and software profile identified from the aggregated asset database; and
  identifying, based on the record, a known security vulnerability that corresponds to the device and software profile identified from the aggregated asset database.

25. The system of claim 24, wherein the record further includes a security policy corresponding to the known security vulnerability.

26. The system of claim 25, wherein determining the set of security policies for the network comprises:
  identifying, based on the record, the security policy corresponding to the known security vulnerability.

27. The system of claim 21, further comprising:
  determining, by the one or more processors and based on device and software profiles identified from the aggregated asset database, that a first computing node in the network is likely to communicate with a second computing node in the network to provide a first service;
  determining, by the one or more processors and based on the first service, a set of message types that are likely to be transmitted between the first computing node and the second computing node to provide the first service; and
  further generating by the one or more processors the whitelisting policy for communications between the first computing node and the second computing node based on the set of message types that are likely to be transmitted between the first computing node and the second computing node to provide the service, wherein the whitelisting policy is included in the network security configurations.

* * * * *